US006202684B1

(12) United States Patent
Angel et al.

(10) Patent No.: US 6,202,684 B1
(45) Date of Patent: Mar. 20, 2001

(54) PRESSURE CONTROL SYSTEM

(75) Inventors: Geoffrey Dennis Angel, Hertfordshire; Daniel Kemp, Middlesex, both of (GB)

(73) Assignee: Huntleigh Technology, PLC (GB)

( * ) Notice: Subject to any disclaimer, the term of this patent is extended or adjusted under 35 U.S.C. 154(b) by 0 days.

(21) Appl. No.: 09/322,249

(22) Filed: May 28, 1999

(51) Int. Cl.[7] .................................................. F16K 37/00
(52) U.S. Cl. ........................... 137/557; 137/883; 137/884
(58) Field of Search .................................... 137/883, 884, 137/876, 557

(56) References Cited

U.S. PATENT DOCUMENTS 4,253,379 * 3/1981 Olson ....................................... 91/35
4,341,237 * 7/1982 Stauffer ............................. 137/382.5
4,606,391 * 8/1986 Achterholt ........................... 152/431
4,860,638 * 8/1989 Hosono et al. ......................... 91/536
5,819,782 * 10/1998 Itafuji .................................. 137/240

* cited by examiner

*Primary Examiner*—A. Michael Chambers
(74) *Attorney, Agent, or Firm*—Brown Raysman Millstein Felder & Steiner LLP

(57) ABSTRACT

A pressure control system for controlling pressure in a fluid system includes a compressor for producing pressurized fluid coupled to a rotor valve, a pressure controller, and a visual low-pressure indicator. A manifold directly supports the valve and has, integrated within, the pressure controller, the low-pressure indicator, and the output connections. The pressure controller includes a plunger and a spring communicating with the fluid system. The pressurized fluid acts against the plunger and the spring, and excess fluid is discharged when pressure exceeds a predetermined value. The low-pressure indicator includes a diaphragm movable away from a transparent window, providing a visual indication of the pressure within the system. The manifold assembly provides connectors for supplying fluid to the system.

19 Claims, 3 Drawing Sheets

PRESSURE CONTROL SYSTEM

BACKGROUND OF THE INVENTION

1. Field of the Invention

The present invention relates to a pressure control system for use for example, in controlling fluid pressure in the pressure pads of an alternating pressure mattress of a medical bed.

2. Discussion of Related Art

A known pressure control system for an alternating pressure mattress is shown in FIG. 1. The mattress is part of a medical bed and includes two series of inflatable cells which are interleaved, one series within the other. The cells are alternatively inflatable to support a patient at different locations to prevent the formation of decubitus ulcers, known as bed sores.

Typically, inflation and deflation cycles may last from under two minutes to over twenty minutes.

The pressure control system includes a compressor 1 for producing pressurised fluid, typically air, which is coupled to a rotor valve 2 via conduit 3. The rotor valve 2 couples the air to either one or to both of the first and second supply conduits 4 & 5. The conduits 3, 4 & 5 are formed within a manifold which itself is formed from two plate like parts at least one of which includes on an internal surface a recess, the parts being coupled together to provide the conduits.

The manifold also includes a means of connecting directly thereto a fluid source and a pressure control means coupled to the input conduit 3 for controlling fluid pressures in the system. The pressure control includes a single bellows coupled to the input conduit 6 and a discharge conduit 7 able to discharge fluid from the input conduit which operates dependent on the fluid pressure in the bellows. An optional low pressure indicator is also able to be attached to the system which is dependent upon a micro-switch activating when the bellows is inflated or deflated.

Thus the pressure control system has been successful in use. However the pressure control, low pressure indicator and outlets require auxiliary components and tubing to the manifold which can sometimes lead to failures and the tubing provided in the system can be subject to fluid leaks which may be inherent or caused by damage in use.

SUMMARY OF THE INVENTION

The present invention seeks to provide an improved pressure control system.

According to an aspect of the present invention there is provided a pressure control system for controlling the pressure in at least a first and second fluid system, comprising an input conduit for receiving fluid from a fluid source, means for directing fluid from the input conduit to one or both of the first and second supply conduits, and a pressure control housing including a manifold assembly, the said conduits formed within the manifold assembly, the manifold assembly providing a connector interface for supplying fluid directly to the fluid system, a pressure control means coupled to the input conduit for controlling pressure in the fluid system and a low pressure indicator coupled to the input conduit for visual indication of low pressure in the system.

Preferably, the manifold assembly comprises two plate-like parts at least one of which includes on an internal surface thereof recesses, the parts adapted to be coupled together. Thus by use of the manifold assembly forming the conduits and providing connector(s) for supply of fluid directly to the fluid systems, the amount of tubing as required by prior art systems is reduced.

Advantageously, the pressure control means is located at the input conduit to reduce its complexity and is integrated into the manifold assembly for ease of manufacture. In the preferred embodiment, the pressure control means includes a spring housed within the manifold plate-like parts, an adjuster to adjust the biasing force of the spring and a valve means operable to discharge fluid dependent on the pressure in the system.

Preferably, the rotor valve assembly, which is of conventional design, is connected directly to the manifold assembly, further reducing auxiliary components and simplifying manufacture.

Advantageously, the low pressure indicator is integrated into the manifold assembly. The indicator is located at the input conduit and comprises a diaphragm which is adapted for relative movement in relation to the fluid pressure applied to the system. In a preferred embodiment, the low pressure indicator comprises a diaphragm sealed between the two plate-like parts of the manifold assembly, a spring controlling the movement of the diaphragm in response to a pressure applied to the system. The low pressure indication being the relative movement of the diaghragm away from a transparent window, which is also integrated within the manifold assembly.

It will thus be apparent that by integrating the low pressure indicator into the manifold assembly, and not using the bellows as in prior art systems, the system is much simplified.

Therefore, the overall system by integrating the pressure control, rotor valve, low pressure indicator and connectors into one manifold assembly, has a reduced number of component parts thereby simplifying manufacture and reducing costs.

According to another aspect of the invention, there is provided securing means to secure the manifold assembly to the pressure control housing. Preferably, the securing means includes a surround adjacent the connector(s) provided on the manifold assembly, the surround adapted to engage the housing and more preferably the surround is integral to the manifold.

Thus, by incorporating the securing features into the manifold assembly, the amount of tubing and auxiliary. components are substantially reduced.

BRIEF DESCRIPTION OF THE DRAWINGS

An embodiment of the present invention is described below, by way of example only, with reference to the accompanying drawings in which.

DETAILED DESCRIPTION OF THE PREFERRED EMBODIMENTS

Figure 1:
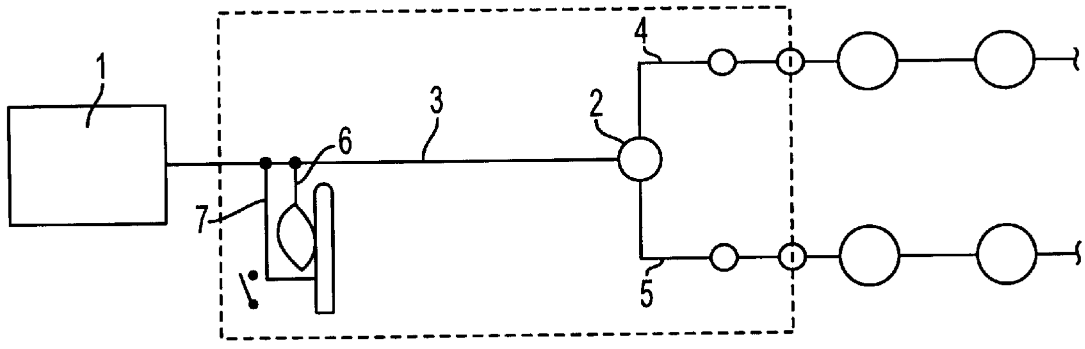
FIG. 1 (PRIOR ART)
FIG. 1 is a schematic diagram of a prior art pressure control system.

Referring to FIG. 1, a prior art pressure control system typically includes a compressor 1 which is coupled to a rotor valve 2 via conduit 3. The rotor valve 2 is coupled to either one or both of the first and second supply conduits 4 and 5. The conduits 3, 4 and 5 are formed within a manifold, which includes a means of connecting thereto a pressure control means coupled to the input conduit 3. The pressure control means includes a single bellows coupled to the input conduit 6 and a discharge conduit 7.

Figure 2:
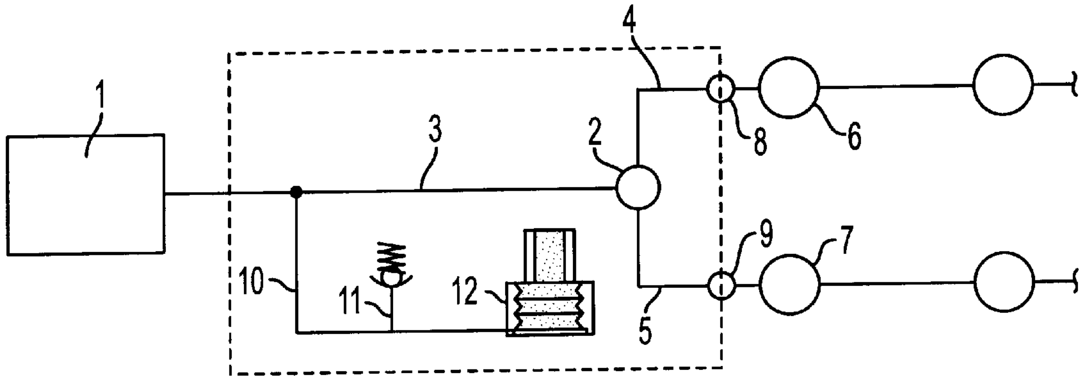
FIG. 2 is a schematic diagram of an embodiment of the pressure control system.

Referring to FIG. 2, the preferred embodiment of the pressure control system includes an input conduit 3 coupled to a compressor 1 for producing pressurised fluid, typically air. A rotor valve 2 is coupled to the input conduit 3 and couples the fluid to either one or both of the first and second supply conduits 4 & 5.

Each supply conduit 4 & 5 is coupled directly to a respective series of inflatable cells 6, 7 which interleave such that a cell from one series is located between two cells of the other series. The supply conduits can be connected directly by means of an output connector 8, 9 to the first and second fluid systems.

Figure 6:
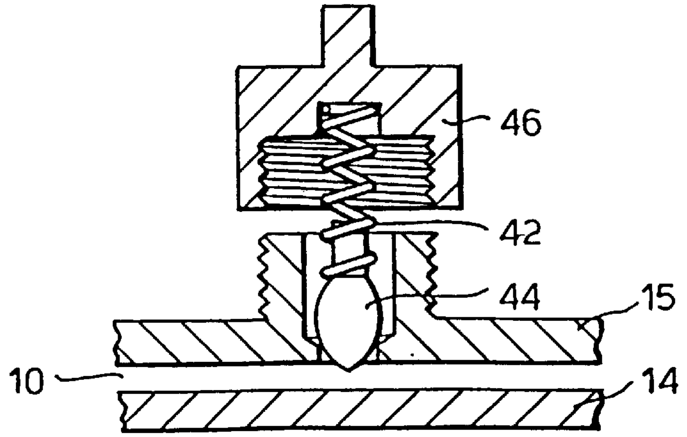
FIG. 6 is a cross sectional view of the pressure adjustment system located within the manifold.

Extending from input conduit 3 is a secondary conduit 10 which is coupled to an adjustable pressure regulator 11, and a low pressure indicator 12. Referring also to FIG. 6, adjustable pressure regulator 11 includes a plunger 44 and spring 42 . The pressurised fluid within conduit 10 acts against the plunger 44 and spring 42 and excess fluid is discharged when the pressure is such that it overcomes the resisting force of the coil spring 42. The force acting on the coil spring 42 can be altered by turning a threaded adjuster 46 and therefore the pressure within the system can be adjusted and controlled.

Figure 3:
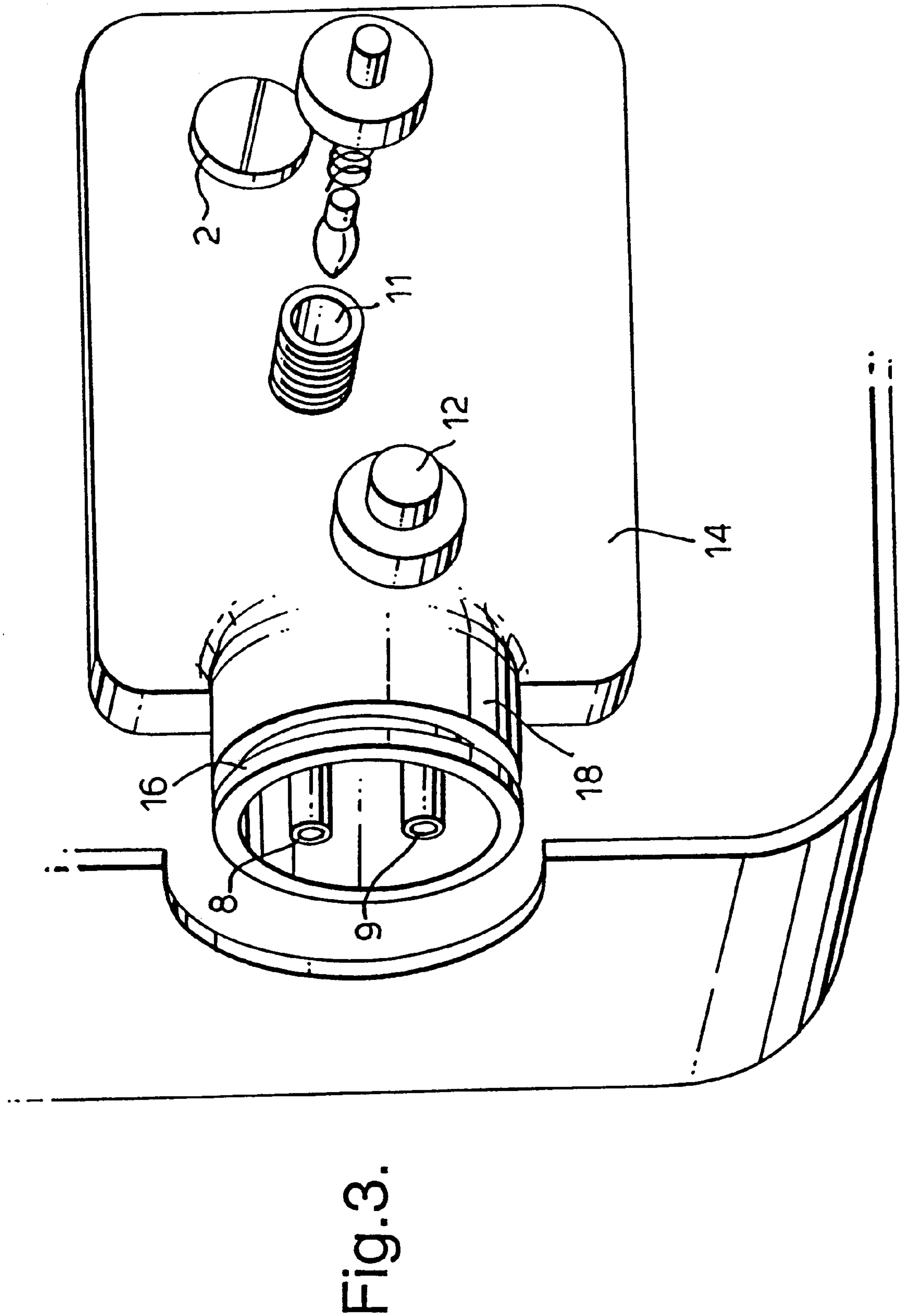
FIG. 3 is an isometric view of the embodiment of the pressure control system locating into a housing.

The conduits 3 ,4, 5, and 10; parts of the rotor valve; the adjustable pressure regulator 11 and low pressure indicator 12 are formed within the manifold assembly 14, as shown in FIG. 3.

Referring to FIG. 3, the manifold assembly 14 is formed from two plates. The manifold assembly 14 includes the adjustable pressure regulator 11, low pressure indicator 12 and connectors 8 & 9 and a mounting area for the rotor valve 2. The manifold assembly 14 is adapted at 16 and 18 for location within a housing. It can be seen from FIG. 3 that by integrating all the features onto the manifold assembly, the need for tubing and auxiliary components is eliminated thus saving manufacturing time and costs.

Figure 4:
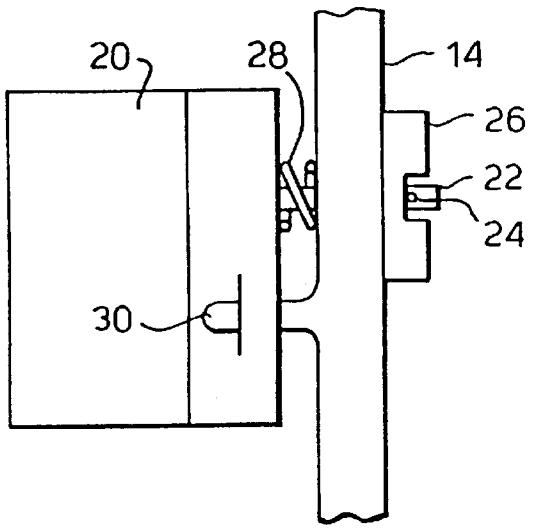
FIG. 4 is a side view of the mounting of a motor onto the manifold.
Figure 5:
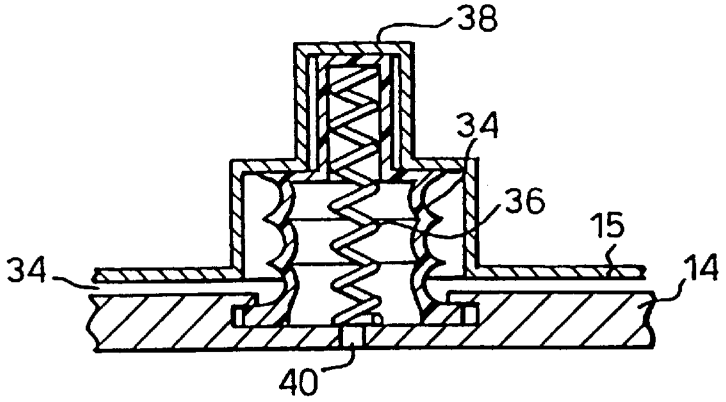
FIG. 5 is a cross sectional view of the pressure indicator located within the manifold.

Referring to FIG. 4, there is shown a motor 20 with the shaft 22 located through the manifold assembly 14 and a rotor valve 26. The motor drive 20, 22 assembled through the manifold 14 provides the rotational drive to the rotor valve 26. Force is applied to the rotor valve 26, which is of conventional design, by the coil spring 28 and the shaft 22 secured by the pin 24. The motor is located and secured by posts 30 and the motor shaft 22 running through the manifold assembly 14 couples the rotor valve 26 to the manifold assembly. Thus, both the valve and motor are secured to the manifold assembly without needing securing screws as in prior art systems.

The low pressure indicator 12 includes a fully enclosed spring controlled diaphragm 34. Conduit 32 allows pressurised air to surround the diaphragm 34 and a pressure differential is created by allowing the air within the diaphragm to exhaust to atmosphere via orifice 40. The coil spring 36 acts as a control constant for the assembly and thus the movement of the diaphragm 34 away from the transparent window 38 is relative to the pressure differential between the pressurised air within conduit 32 and atmosphere.

This movement of the diaphragm 34 as seen through the window 38 provides a direct visual indication of the pressure within the system.

What is claimed is:

1. A pressure control system for controlling the pressure in at least a first and second fluid system, each fluid system having a respective supply conduit, comprising:

an input conduit for receiving fluid from a fluid source, means for directing fluid from the input conduit to at least one of the first and second supply conduits, and a pressure control housing including a manifold assembly; the conduits being formed within the manifold assembly;

wherein the manifold assembly includes:

a connector interface for supplying fluid directly to the respective fluid system;

a pressure control means coupled to the input conduit for controlling pressure in the respective fluid system;

and a low pressure indicator coupled to the input conduit for providing an indication of a low pressure in the respective fluid system.

2. The pressure control system as claimed in claim 1 wherein the manifold assembly comprises two plate-like parts, at least one of which includes recesses on an internal surface thereof, the parts adapted to be coupled together.

3. The pressure control system as claimed in claim 2, wherein the manifold assembly includes the pressure control means.

4. The pressure control system as claimed in claim 3 wherein the pressure control means includes a spring housed within the manifold plate-like parts, an adjuster to adjust the biasing force of the spring, and valve means operable to discharge fluid depending on the pressure in the fluid system.

5. The pressure control system as claimed in claim 1 wherein the manifold assembly further includes a connector for connecting directly thereto a rotor valve assembly as the means for directing fluid from the input conduit to at least one of the supply conduits.

6. The pressure control system as claimed in claim 1 wherein the manifold assembly includes the low pressure indicator.

7. The pressure control system as claimed in claim 6 wherein the low pressure indicator comprises a diaphragm sealed between the two plate-like parts of the manifold assembly, and a spring controlling the movement of the diaphragm in response to pressure applied to the respective fluid system.

8. The pressure control system as claimed in claim 1 wherein the manifold assembly includes securing means to attach the manifold assembly to the pressure control housing.

9. The pressure control system as claimed in claim 8 wherein the securing means includes a surround element adjacent to at least one of the connectors provided on the manifold assembly, the surround element being adapted to engage the pressure control housing.

10. The pressure control system as claimed in claim 9 wherein the surround element is integrated with the manifold assembly.

11. A pressure control system for controlling the pressure in a plurality of fluid systems, with each of the fluid system having a respective supply conduit, comprising:

an input conduit for receiving fluid from a fluid source;

means for directing fluid from the input conduit to at least one of the supply conduits; and a pressure control housing including a manifold assembly;

wherein the conduits are positioned within the manifold assembly; and wherein the manifold assembly includes:

a connector interface for supplying fluid directly to the respective fluid system;

a pressure control means coupled to the input conduit for controlling pressure in the respective fluid system; and a low pressure indicator coupled to the input conduit for providing an indication of a low pressure condition in the respective fluid system.

12. The pressure control system of claim 11 wherein the manifold assembly comprises two plate-like parts, at least one of which includes recesses on an internal surface thereof, the parts being adapted to be coupled together.

13. The pressure control system of claim 12, wherein the manifold assembly includes the pressure control means.

14. The pressure control system of claim 12 wherein the pressure control means includes:

a spring housed within the manifold plate-like parts;

an adjuster to adjust the biasing force of the spring; and valve means operable to discharge fluid depending on the pressure in the fluid system.

15. The pressure control system of claim 11 wherein the manifold assembly further includes a connector for connecting directly thereto a rotor valve assembly as the means for directing fluid from the input conduit to at least one of the supply conduits.

16. The pressure control system of claim 11 wherein the manifold assembly includes the low pressure indicator.

17. The pressure control system of claim 16 wherein the low pressure indicator includes:

a diaphragm sealed between the two plate-like parts of the manifold assembly; and a spring controlling the movement of the diaphragm in response to pressure applied to the respective fluid system.

18. The pressure control system of claim 11 wherein the manifold assembly includes securing means to attach the manifold assembly to the pressure control housing.

19. A pressure control system for controlling the pressure in a plurality of fluid systems, with each of the fluid systems having a respective supply conduit, comprising:

means for directing fluid to at least one of the supply conduits; and a pressure control housing including a manifold assembly;

wherein the supply conduits are positioned within the manifold assembly;

wherein the manifold assembly includes:

a connector interface for supplying fluid directly to the respective fluid system;

a pressure control means coupled to the input conduit for controlling pressure in the respective fluid system; and a low pressure indicator coupled to the input conduit for providing a visual indication of a low pressure condition in the respective fluid system.

* * * * *